Patented Feb. 7, 1950

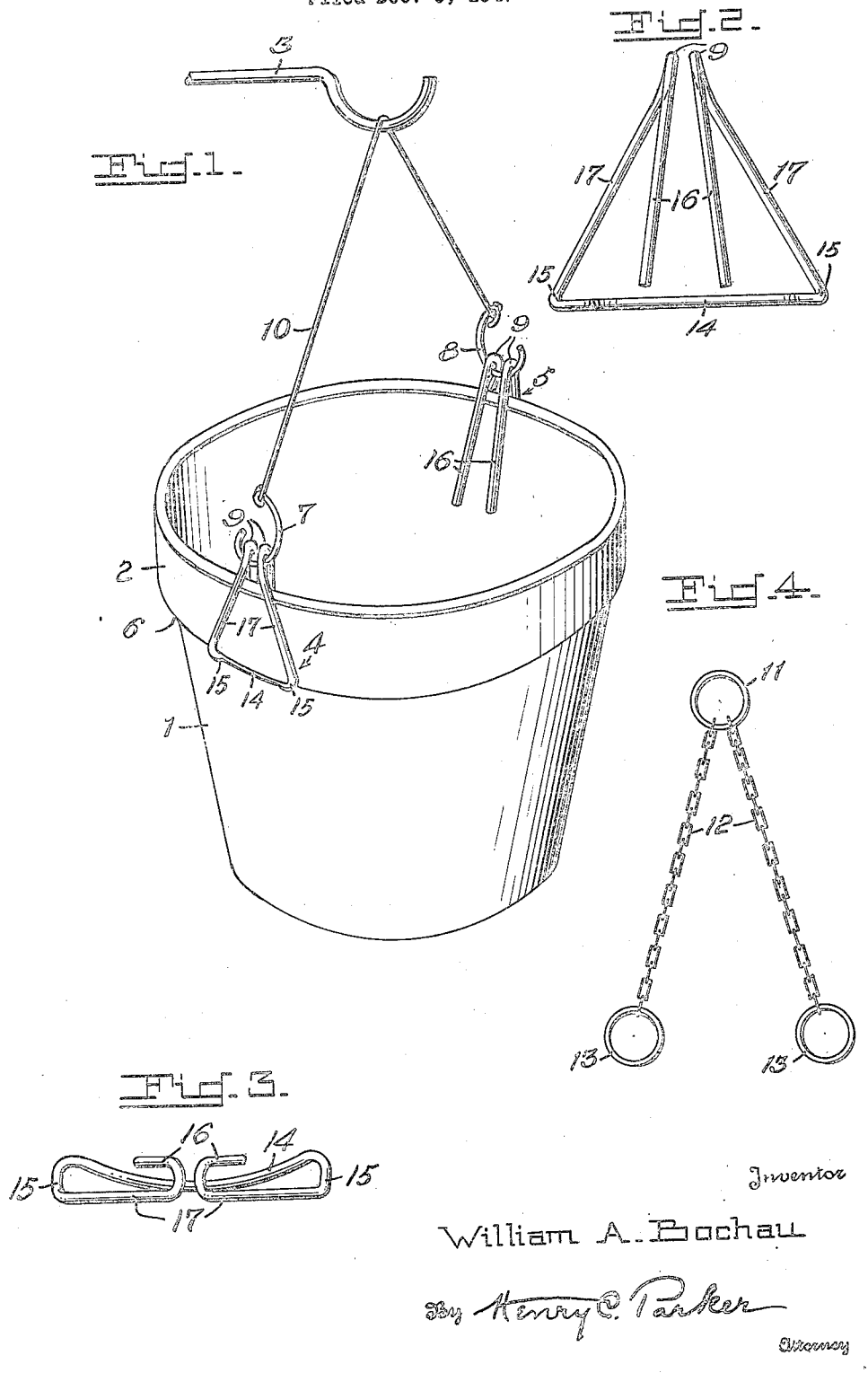

2,496,851

UNITED STATES PATENT OFFICE 2,496,851

FLOWERPOT HANGER

William A. Bochau, Baltimore, Md.

Application December 9, 1947, Serial No. 790,648

3 Claims. (Cl. 248—318)

This invention relates to flower pot hangers; and it comprises a device for suspending or hanging the usual clay flower pots, consisting of at least two spring clips adapted to snap over the rims of the pots on opposite sides thereof in combination with suspending means connecting said clips; said clips comprising an elongated central arcuate section adapted to fit around the outside beneath the rim of the pot, upstanding offset branches at the ends of said central section converging upwardly with closely adjacent loops at the top, said loops terminating in depending branches adapted to grip the inside wall of the pot, said upstanding branches being off-set from said central section to an extent sufficient to clear the rim of the pot, and said suspending means being attached at either end to the loops of said clips; all as more fully hereinafter set forth and as claimed.

Suspended flower pots have been in use since early antiquity. For obvious reasons it usually has been considered necessary either to use pots with decorative exteriors or to employ decorative hangers to conceal utilitarian flower pots. Red clay flower pots have been used for probably a century or longer and they have been standardized in design for many years, being of frustroconical shape with a straight-sided interior wall and provided at their tops with an exterior flange or rim. These red pots are, of course, somewhat unsightly but clay pots of similar shape are now available in various colors some of which are much more decorative. For green house use the color of the pots is, of course, immaterial. Many plants and flowers grow best in suspended pots, one example being orchids. And the recent rapid increase in the growing of orchids as a hobby has created an important demand for a simple device for suspending flower pots. It is believed that the present invention supplies an ideal device for this purpose.

My flower pot hanger consists of a pair of snap-on clips formed of spring wire or strip having arcuate central sections which clamp under the rim on the outside of the pot with upstanding branches at either end of the arcuate section which are off-set sufficiently to clear the rim. These branches converge upwardly and are bent to form loops to which a suspending cord, chain or the like is attached, and the ends of the wire or strip depend downwardly from the loops and are adapted to press resiliently against the inside wall of the pot in order to hold the arcuate section firmly against the outer wall of the pot underneath the rim. The rim of the pot in effect forms a shoulder against which the arcuate sections of the clips press in order to support the weight of the pot. A firm grip is thus provided and I have found that my clips, even when made of rather small gauge spring wire, are adequately strong to hold the average flower pot. Of course the clips can be made of different sizes and weights depending upon the size of the flower pot to be supported. And the larger, heavier clips are sufficiently strong to support any of the conventional larger size pots.

My invention can be explained in greater detail by reference to the accompanying drawing which shows, more or less diagrammatically, a preferred embodiment of my pot hanger. In this showing, Fig. 1 is a perspective view of my pot hanger attached to a pot and serving to suspend said pot from a wall bracket, Fig. 2 is an elevation of one of the clips constituting my hanger, as viewed from the rear, Fig. 3 is a top or plan view of one of said clips, while Fig. 4 shows a modified suspending means for the clips of my hanger.

In the various views like parts are designated by like reference numerals. Referring to Fig. 1, a clay flower pot 1 is shown provided with the conventional overhanging rim or flange 2. This pot is suspended from a wall bracket 3 by means of the pot hanger of the present invention. This pot hanger comprises two spring clips, shown generally at 4 and 5, which clip over the rim of the pot and engage the underside 6 of the overhang, these clips being connected by suspending means. The suspending means may take various forms. In Fig. 1 the suspending means comprises two hooks 7 and 8 which engage the clips by their loops 9 and which may be connected by a cord or chain 10. The latter passes over a wall bracket, as shown in the drawing. An alternative suspending means is shown in Fig. 4. This consists of an upper suspending ring 11 connected by chains 12 to two clip-engaging rings 13.

As shown in Figs. 2 and 3 the spring clips of my pot hanger comprise an arcuate, horizontal, central section 14 adapted to fit around the outside of the pot beneath the rim. The clips are bent outwardly at each end 15 of their arcuate sections to clear the overhang and then upwardly at acute angles to form unstanding off-set branches 17 which converge upwardly. These branches are bent reversely backwards to form loops 9 at the top of the clips and depending branches 16 which are adapted resiliently to grip the inside wall of the pot. The loops at the top of the clips should be sufficiently close so that they can be engaged by hooks or rings provided for suspending purposes. As shown in Fig. 3 the depending branches are separated from the central arcuate sections of the clips by a horizontal distance which is less than the thickness of the overhanging rim of the pot so that there is a spring action tending to grip the rim.

My clips can be constructed of any type of resilient material, such as spring wire or strip material—steel, bronze or brass, for example. They can also be made of various resilient plastic materials, such as casein plastics, vinyl polymer resins, etc. They can be made by molding or by punching and stamping operations.

While I have described what I consider to be the best embodiments of my invention, it is evident, of course, that various modifications can be made in the specific structures which have been disclosed without departing from the purview of this invention. It is possible, for example, to employ three of my clips instead of two for suspending a flower pot. When three clips are employed the central arcuate sections thereof can be made shorter, a length of only half an inch or so being ample. The upstanding branches of these clips can then be made substantially vertical. When only two clips are used the arcuate sections should be made sufficiently long to prevent the pot from tipping, that is, to give lateral support to the pot. With the conventional flower pots having rims of from 1 to 2 inches in height, the central sections of my clips can be made of substantially the same length or slightly longer than the heights of the rims, that is, from about 1 to 3 inches. The upstanding branches must be made, of course, slightly longer than the heights of the pot rims since the loops at the top of the clips have to project somewhat above the tops of the pots. The lengths of the depending inner branches of the clips should approximate the heights of the pot rims since they should press against the inner walls of the pots at points not substantially above the lower margins of the pot rims. In other words the inner depending branches should have lengths corresponding substantially to the vertical distances between the loops at the top and the arcuate sections of the clips. If these inner branches should be made too short the strength of the gripping action of the clips on the pot would be reduced. The inner branches can be bent in such fashion that they diverge downwardly, if desired. This reduces any tendency of the pot to tip laterally but makes it more difficult to apply the clips to pots which are filled with earth. The dimensions as well as the shape of my clips can be varied to a considerable extent within the skill of the art. The stock from which the clips are made can be of circular cross section, that is, ordinary wire, or it can be of square or oblong cross section. It is usually cheaper to make them from spring wire although, when made of extruded plastic material, a square or oblong cross section with rounded corners is usually more advantageous. Clips made from 12 gauge steel or brass wire with an arcuate section about 2¼ inches long are suitable for suspending pots having inner diameters of from about 4 to 7 inches. Other modifications of my invention which fall within the scope of the following claims will be immediately evident to those skilled in the art.

What I claim is:

1. A flower pot hanger adapted to suspend the conventional flower pot having a frusto-conical shape with an outer rim, which comprises in combination at least two spring clips each having a single horizontal outer arcuate section conforming to the shape of the pot and adapted to grasp the outside wall of the pot beneath the rim, said horizontal arcuate section being of sufficient length to prevent the pot from tipping when hung, upstanding branches at either end of said arcuate section bent at the top to form loops and constructed to converge at the top so that the loops are closely adjacent, said loops having depending inner branches bent so as to permit the clip to be slipped over the lip of the pot and adapted to press resiliently against the inside wall of the pot, said upstanding branches being of equal length and being off-set from said arcuate section so as to fit around the rim of the pot, and suspending means secured to the loops of said clips.

2. The flower pot hanger of claim 1 wherein the length of the inner depending branches of the clips approximates the vertical distance between the loops at the top and the arcuate sections of the clips.

3. The flower pot hanger of claim 1 wherein the suspending means comprises a pair of hooks adapted to engage said loops with a flexible connector attached to said hooks.

WILLIAM A. BOCHAU.

REFERENCES CITED

The following references are of record in the file of this patent:

UNITED STATES PATENTS

| Number | Name | Date |
|---|---|---|
| 1,334,199 | Weiseman | Mar. 16, 1920 |
| 2,315,146 | White | Mar. 30, 1943 |